United States Patent
Jenaro Rabadan et al.

(10) Patent No.: US 8,649,919 B2
(45) Date of Patent: Feb. 11, 2014

(54) METHOD AND DEVICE FOR ATTENUATING THE EFFECTS OF TURBULENCE ON AN AIRCRAFT

(75) Inventors: Guillermo Jenaro Rabadan, Toulouse (FR); Stephane Puig, Lauzerville (FR)

(73) Assignee: Airbus Operations S.A.S., Toulouse (FR)

( * ) Notice: Subject to any disclaimer, the term of this patent is extended or adjusted under 35 U.S.C. 154(b) by 187 days.

(21) Appl. No.: 13/119,019

(22) PCT Filed: Oct. 30, 2009

(86) PCT No.: PCT/FR2009/001261
§ 371 (c)(1),
(2), (4) Date: Mar. 15, 2011

(87) PCT Pub. No.: WO2010/052382
PCT Pub. Date: May 14, 2010

(65) Prior Publication Data
US 2011/0172853 A1    Jul. 14, 2011

(30) Foreign Application Priority Data
Nov. 5, 2008    (FR) ........................ 08 06156

(51) Int. Cl.
*G01C 23/00* (2006.01)
*G05D 1/00* (2006.01)
*G05D 1/10* (2006.01)
*B64C 19/00* (2006.01)

(52) U.S. Cl.
USPC ............... 701/3; 244/195; 244/177; 244/75.1

(58) Field of Classification Search
USPC ............. 701/3, 10, 14, 16, 29; 340/501, 588, 340/589, 870.17, 968, 945, 963; 702/127, 702/144, 182, 183, 184, 185
See application file for complete search history.

(56) References Cited

U.S. PATENT DOCUMENTS 5,272,513 A * 12/1993 Vahala et al. ................ 356/28.5
5,375,794 A * 12/1994 Bleeg .......................... 244/76 C
(Continued)

FOREIGN PATENT DOCUMENTS

FR    2 891 802    4/2007
FR    2 912 991    8/2008

OTHER PUBLICATIONS

U.S. Appl. No. 13/129,054, filed May 12, 2011, Jenaro Rabadan, et al.

(Continued)

*Primary Examiner* — Thomas Black
*Assistant Examiner* — Tyler Paige
(74) *Attorney, Agent, or Firm* — Oblon, Spivak, McClelland, Maier & Neustadt, L.L.P.

(57) ABSTRACT

A method for attenuating effects of turbulence on an aircraft, and a device to implement the method, the method including: using at least one signal on a wind profile signal, along an excitation direction, representing, at a given moment in an aircraft referential, a component along the excitation direction of the wind speed at a front of the aircraft according to a distance along a longitudinal direction of the aircraft; carrying out a frequency determination, in which the wind profile signal is processed to determine a frequential content; and selecting a control strategy to be adopted according to the previously determined frequential content, the strategy enabling at least one applicable control law to be identified.

15 Claims, 2 Drawing Sheets

(56) References Cited

U.S. PATENT DOCUMENTS

| | | | |
|---|---|---|---|
| 5,534,868 A * | 7/1996 | Gjessing et al. | 342/26 D |
| 6,416,017 B1 * | 7/2002 | Becker | 244/76 C |
| 6,871,816 B2 * | 3/2005 | Nugent et al. | 244/3.16 |
| 6,915,989 B2 * | 7/2005 | Najmabadi et al. | 244/195 |
| 7,191,985 B2 * | 3/2007 | Najmabadi et al. | 244/195 |
| 7,757,993 B1 * | 7/2010 | Hahn | 244/195 |
| 8,255,174 B2 * | 8/2012 | Jenaro Rabadan et al. | 702/42 |
| 2008/0251648 A1 * | 10/2008 | Colomer et al. | 244/76 C |
| 2008/0265104 A1 | 10/2008 | Fabre-Raimbault et al. | |
| 2009/0048723 A1 * | 2/2009 | Nugent et al. | 701/10 |

OTHER PUBLICATIONS

International Search Report issued Jan. 7, 2010 in PCT/fr09/001261 filed Oct. 30, 2009.

* cited by examiner

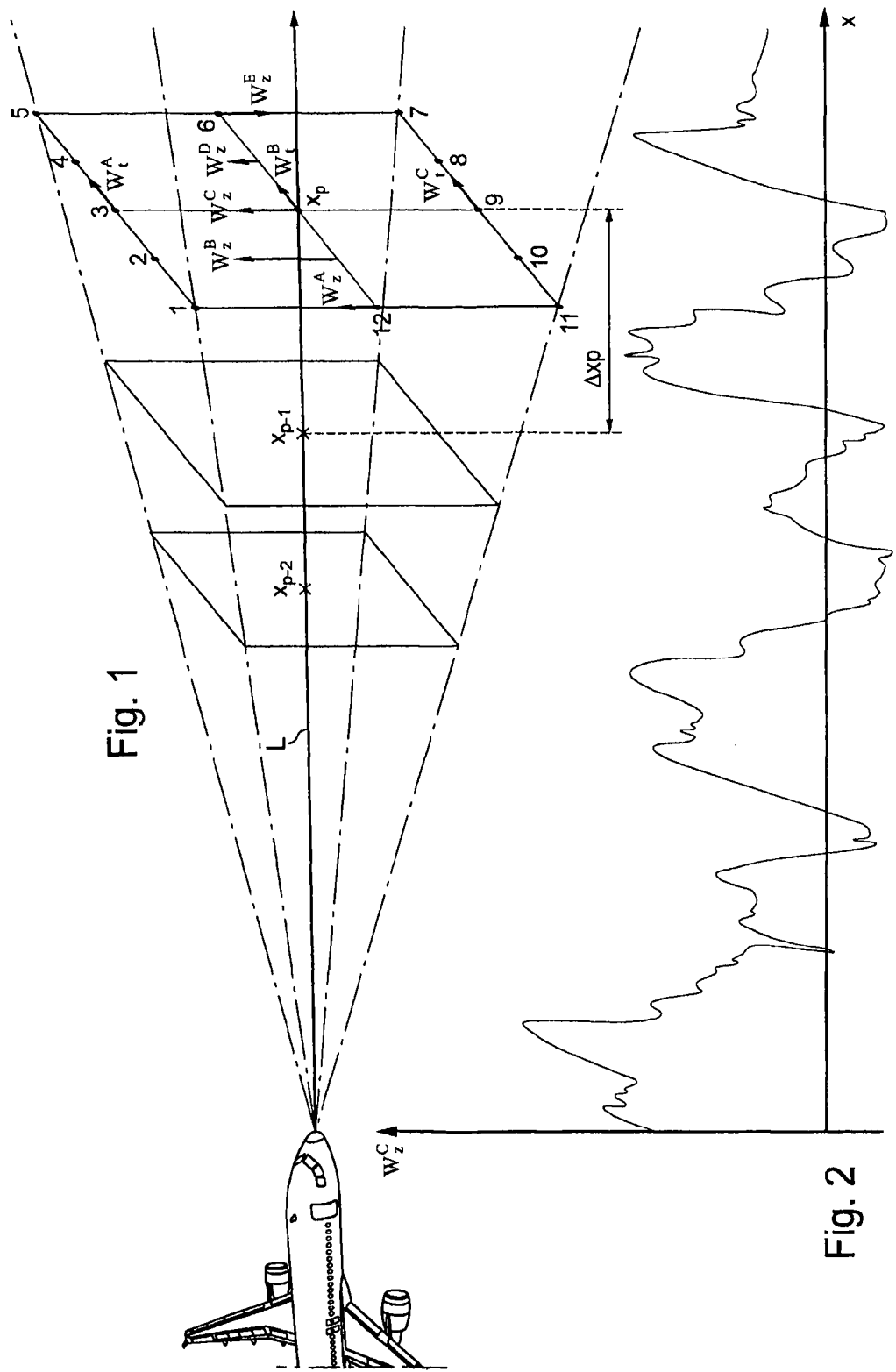

METHOD AND DEVICE FOR ATTENUATING THE EFFECTS OF TURBULENCE ON AN AIRCRAFT

The present invention relates to a method and a device for attenuation the effects of turbulence on an aircraft.

BACKGROUND OF THE INVENTION

Certain elements of the prior art or of the invention are described here in a spatial frame of reference related to the aircraft, referred to as aircraft frame of reference. Throughout the description, this aircraft frame of reference is defined in the usual way by a longitudinal direction of the aircraft, a transversal direction of the aircraft and a third direction, orthogonal to the other two, which by convention is referred to as vertical direction, even though it does not coincide—at least during flight—with the "vertical" of a terrestrial frame of reference such as defined by gravity. When any doubt is possible as to the frame of reference in question, the "vertical" of the terrestrial frame of reference is referred to as gravity direction.

Furthermore, the term "wind" designates the total air movement at a given point, which results from superposition of the mean air movement (laminar flow) and of the turbulence at that point. Turbulence is an agitation composed of complex and disordered movements, constantly changing.

Turbulence has detrimental effects on the aircraft. In particular, it may induce: vertical accelerations of the aircraft, capable of displacing objects or passengers in the cabin; a change of altitude levels, which in particular may cause a risk of collision with another aircraft; excess loads on the wing group; large roll moments; a sensation of discomfort in the cabin, etc.

Three types of turbulence in particular are responsible for problems caused for the aircraft:
- clear air turbulence, which results from wind shear; this turbulence, non-convective, appears at high altitude close to the jet streams, most often above mountains and more likely in winter,
- convective turbulence, which appears inside or close to clouds; very severe turbulences may occur in storm clouds, where there coexist vertical currents in opposite direction that may reach tens of m/s. These phenomena are local and in general are visible (because of the presence of the clouds).
- wake turbulence, created by the passage of an aircraft; the vortices generated by a heavy aircraft may induce large roll moments on a lighter aircraft.

Because they increase the loads on the wing group, turbulences make it necessary to reinforce the aircraft structure; consequently they have an impact on the weight of the aircraft. In addition, turbulences fatigue the aircraft structure and, because of this fact, limit its useful life or at the very least detract from its operational profitability by necessitating frequent inspections of the structure and equipment items of the aircraft. Also, and above all, turbulences are the primary cause of injuries among passengers, not including fatal accidents.

The detection and measurement of turbulences as well as the employment of corresponding remedial actions therefore represent high stakes.

It is known that the effects of turbulence on an aircraft can be attenuated by actuating mobile control surfaces of the aircraft, such as ailerons, flaps, spoilers, slats, elevators, rudders, elevons, etc., so as to limit the load variations to which the aircraft is subjected.

FR 2891802 additionally teaches that the effects of vertical turbulence can be attenuated by calculating a control instruction for a mobile control surface according, on the one hand, to the vertical component of wind speed at the current position of the aircraft and, on the other hand, to a level of severity of the vertical turbulence occurring at the current position of the aircraft, this level of severity being calculated on the basis of the aforesaid vertical component of the wind. In practice, when the aircraft is an airplane, the vertical component of the wind is measured by an anemometric sensor placed on the nose of the airplane, in order to know with a short lead time the wind to which the airplane wings will be subjected. Nevertheless, even in the largest airplanes, this lead time remains shorter than 100 ms. Considering the output speed of the known actuators, it is therefore not possible to turn control surfaces situated on the wings to full deflection.

To remedy this disadvantage, it is also known that lidars (acronym for "Light Detection and Ranging", meaning detection by light waves and telemetry) can be used to measure wind speeds ahead of the aircraft at a given distance therefrom, with a view to detecting the turbulences occurring at that distance. A lidar is an active transducer comprising a laser that emits a directed incident light beam, a telescope that collects the wave backscattered by the particles encountered by the incident beam, and processing means. The backscattered wave collected at the instant $t=2d/c$ (where "c" denotes the speed of light) after emission of an incident beam corresponds to the wave backscattered by the atmospheric layer situated at the distance "d" from the lidar, referred to as sight distance. According to the Doppler effect, the speed of displacement of the said atmospheric layer in the sight direction of the lidar is deduced from the difference between the frequency of the incident beam and that of the backscattered wave. The measurement of the wind at a given distance ahead of the aircraft makes it possible to evaluate the phenomena that will affect the aircraft with a lead time longer than 100 ms, and therefore offers the possibility of turning a control surface to full deflection if necessary.

Nevertheless, the known devices and methods employed for attenuating the effects of turbulence are not entirely satisfactory.

SUMMARY OF THE INVENTION

The present invention is intended to propose a method and a device making it possible to attenuate the effects of turbulence on an aircraft more effectively than the known prior art methods and devices.

Thus the invention is intended to limit the load variations to which the aircraft is subjected even more, to enhance safety and, as the case may be, to improve the comfort of the passengers.

To achieve this, the invention relates to a method for attenuating the effects of turbulence on an aircraft, characterized in that it comprises the following steps:
- using at least one signal, referred to as wind profile signal in a direction referred to as excitation direction, representing, at a given instant in an aircraft frame of reference, the component, in the said excitation direction, of the wind speed ahead of the aircraft according to the distance "x" in a longitudinal direction of the aircraft,
- executing a step referred to as frequency determination step, in which this wind profile signal is processed so as to determine its frequency content, selecting a control strategy to be adopted according to the previously determined frequency content, which strategy makes it possible to identify one or more applicable control rules.

Advantageously, a control rule to be applied for operating the mobile control surfaces of the aircraft is then determined according in particular to the previously selected control strategy.

For the first time, the invention therefore makes it possible, on the one hand, to estimate the frequencies at which the aircraft tends to be excited relative to its movement, and, on the other hand, to adapt the employed remedial actions to these frequencies, or in other words to choose, accordingly, a control strategy that will then make it possible to target the mobile control surfaces to be actuated and the corresponding actuation parameters.

In fact, the frequency, at a given distance x, of a wind profile signal according to the invention, is representative of the frequency at which the aircraft will be excited in the excitation direction (of the said profile) when it arrives at the position in the atmosphere corresponding to this given distance x. Such a wind profile signal therefore makes it possible to know, for example, if the aircraft is susceptible to being excited in a natural mode of its structure. In practice, the frequency determination step according to the invention is therefore preferably oriented according to the frequencies wished to be detected (or in other words, according to one or more natural modes of the aircraft).

A wind profile signal such as used according to the invention may be constructed as follows:

by measuring iteratively, by means of a lidar, the wind speeds at a plurality of pairs of measurement points situated at different distances, referred to as measurement distances, from the nose of the aircraft. As explained in the foregoing, a lidar makes it possible to measure, at a given measurement point, the wind speed in the sight direction of the lidar at that point. The vector difference between the speed vectors obtained for two measurement points—forming a pair of measurement points—may be likened to the component, in the direction connecting the said measurement points, of the wind speed at a point of the atmosphere situated (at the moment of the measurement) between these two measurement points. A lidar such as defined hereinabove therefore makes it possible to calculate wind speed components at different distances from the aircraft;

by constructing a wind profile signal in an excitation direction from a plurality of measurements comprising the last or possibly the second-last measurement made at each of the measurement distances for at least one pair of measurement points aligned in the excitation direction. Such a signal may be constructed, for example, by interpolation.

It should be noted that the number of pairs of measurement points taken into account for construction of a wind profile signal possibly may vary from one signal to another (as explained hereinafter).

Preferably, at least one wind profile signal is constructed in the vertical direction in a median vertical longitudinal plane (symmetry plane) of the aircraft, the said signal representing, at a given instant, the vertical component of the wind speed in this median plane ahead of the aircraft. This is established on the basis of measurements of wind speed at a pair of measurement points belonging to the said median plane at each measurement distance for which such a pair is acquired.

Preferably, each measurement distance may be defined beforehand not only in units of length, for example in meters or feet, but also in units of time, preferably in seconds. For this purpose there are provided calculating means capable of calculating the distance (expressed in units of length) between the lidar and each measurement point, on the basis of the measurement distance expressed as time and of data representative of the airspeed of the aircraft, furnished in real time by a processing unit of the aircraft. These calculating means may be integrated into the said processing unit of the aircraft or into a processing unit specific to the lidar.

Advantageously, wind speeds are measured up to measurement distances reaching 4 seconds or 800 meters, or even 5 seconds or 1000 meters, possibly even 7 seconds or 1400 meters. In practice, the maximum measurement distance is chosen according to the lowest frequency wished to be detected.

Advantageously, the step of measuring wind speeds may additionally have one or more of the following characteristics:

wind speeds are measured at six measurement points at least for each measurement distance, which points form—at each measurement distance—three pairs, referred to as vertical pairs, of measurement points aligned in the vertical direction; advantageously, these measurement points also form at least one pair, referred to as transversal pair, of measurement points aligned in the transversal direction. Preferably, for each measurement distance or for only some of them, wind speeds are measured at ten measurement points at least, forming five vertical pairs of measurement points;

wind speeds are measured at one measurement distance at least close to the aircraft, for example less than 250 ms or 50 m and preferably less than 150 ms or 30 m, in order to offer a device alternative to the anemometer of the aircraft;

wind speeds are measured at measurement distances positioned progressively closer to one another in the direction of the aircraft. In other words, if "x" denotes the measurement distance and "$\Delta x$" denotes the distance between two successive measurement distances, $\Delta x$ advantageously increases with x.

Advantageously, in the frequency determination step according to the invention, a wind profile signal is processed so as to determine if it or part thereof contains at least one frequency included in at least one predefined frequency range. Preferably:

the wind profile signal is processed so as to determine if it or part thereof contains at least one frequency close to a rigid natural mode of the aircraft. For example, in the case of a wind profile signal in the vertical direction, the said signal is advantageously processed so as to determine if it or part thereof contains at least one frequency close to a natural mode of the aircraft known by the term incidence oscillation frequency; thus the wind profile signal is advantageously processed so as to determine if it contains at least one frequency lower than 0.5 Hz (the incidence oscillation frequency of an aircraft generally being on the order of 0.2 Hz to 0.4 Hz);

alternatively, or preferably in combination, the wind profile signal is processed so as to determine if it or part thereof contains at least one frequency close to a flexible natural mode of the aircraft and especially of its wing group (wings but also vertical and horizontal stabilizers) or of its fuselage. For example, in the case of a wind profile signal in the vertical direction, and in order to evaluate the risks to which the wings of the aircraft are exposed, the said signal is processed so as to determine if a part thereof corresponding to the distance range [0; 400 m] or

[0; 2 s] contains at least one frequency above 0.5 Hz, or (depending on the aircraft) if a part thereof corresponding to the distance range [0; 200 m] or [0; 1 s]—or alternatively [200 m; 400 m] or [1 s; 2 s]—contains at least one frequency higher than or equal to 1 Hz. By analogy, and in order to evaluate the risks to which the fuselage is exposed, the wind profile signal may also be processed in the vertical direction so as to determine if a part thereof corresponding to the distance range [0; 200 m] or [0; 1 s]—or even [0; 100 m] or [0; 0.5 s] or preferably [100 m; 200 m] or [0.5 s; 1 s]—contains at least one frequency higher than or equal to 2.5 Hz (or even higher than or equal to 3 Hz, depending on the aircraft);

as the case may be, the wind profile signal is processed so as to determine additionally if it or a part thereof contains at least one frequency between 0.5 and 1 Hz.

The frequency determination step according to the invention may be achieved in diverse ways.

According to a first embodiment, the wind profile signal is processed by means of at least one low-pass filter and at least one high-pass filter. The low-pass filter makes it possible to attenuate or even eliminate the high frequencies and therefore to detect the low frequencies; conversely, the high-pass filter makes it possible to detect the high frequencies. The said filters are chosen according to the frequency ranges to be sought. It is advantageous, for example, to use, on the one hand, a low-pass filter whose cutoff frequency (frequency above which the frequencies are attenuated or eliminated) is substantially equal to 0.5 Hz, and, on the other hand, a high-pass filter whose cutoff frequency (frequency below which the frequencies are attenuated or eliminated) is substantially equal to 0.5 Hz or to 1 Hz. As the case may be, there is also used a high-pass filter whose cutoff frequency is substantially equal to 2.5 Hz.

According to a second embodiment, a mean period of the wind profile signal is evaluated over the signal part to be processed (or in other words, over the interval [0; 400 m] or [0; 2 s] or the interval [0; 200 m] or [0; 1 s] or the other intervals mentioned above or the entirety of the signal, depending on the frequency range sought), according to the number of passes of the said signal through the value zero over this part. The inverse of this mean period evaluated so yields a mean frequency of the signal over the processed part.

According to a third embodiment, a mean standard deviation of the wind profile signal is evaluated over the signal part to be processed, on the basis of the maximum amplitude of the signal over this part and of a constant coefficient predetermined empirically and statistically, which coefficient represents the mean ratio between the standard deviation and the maximum amplitude of a wind profile signal. The standard deviation estimated in this way is then compared with a range of standard deviations corresponding to the frequency range sought, which range of standard deviations is determined beforehand by integration of part of a Von Karman or Kolmogorov spectrum, which represents an energy density according to the spatial frequency and is pre-established empirically and statistically.

Advantageously, in the step of selecting the control strategy:
if the determined frequency content is composed mainly of frequencies close to a rigid natural mode of the aircraft, such as its incidence oscillation frequency, or in other words frequencies lower than or equal to 0.5 Hz, for example, a control strategy referred to as comfort strategy is selected, intended to improve the comfort of persons in the aircraft,
if the determined frequency content is composed mainly of frequencies close to a flexible natural mode of the aircraft, or in other words frequencies higher than 0.5 Hz, than 1 Hz or than 2.5 Hz, for example, a control strategy referred to as structural preservation strategy is selected, intended to preserve the structure of the aircraft,
if the determined frequency content is composed both of frequencies close to a rigid natural mode of the aircraft and of frequencies close to a flexible natural mode thereof, in substantially equivalent proportions, a control strategy referred to as mixed strategy is selected, intended to simultaneously improve the comfort of persons and preserve the structure of the aircraft.

Advantageously, the selection of the comfort strategy leads to the application of control rules that bring about activation of mobile control surfaces chosen from among: elevators, rudders, elevons and possibly flaperons, spoilers and ailerons.

The selection of the structural preservation strategy preferably leads to the application of control rules that bring about activation of mobile control surfaces chosen from among: ailerons, spoilers, flaps, slats, and possibly even elevators and rudders.

The selection of the mixed strategy leads to the application of control rules that bring about activation of mobile surfaces chosen from among all of the mobile control surfaces of the aircraft.

The invention also provides for the possibility of using, as mobile control surfaces, surfaces of the wing group (wings and/or tail) of the aircraft designed so as to undergo deformation, or in other words surfaces whose geometry can be modified by deformation (and not simply by jointing).

The selection of a control strategy therefore makes it possible to identify one or more applicable control rules. In one version of the invention, the control rule to be applied is derived directly from the selected control strategy and possibly from the frequency content of the wind profile signal.

In a preferred variant, the control rule to be applied is chosen from among the applicable control rules (which are derived from the selected control strategy) according to one or more amplitude maxima presented by the wind profile signal. If the frequency content of the said signal comprises mainly "high" frequencies (flexible natural modes of the aircraft, structural preservation strategy), the applicable control rule is chosen according to the amplitude maximum (or if necessary several amplitude maxima) recorded over the distance range [0; 200 m] or [0; 1 s] or over the distance range [0; 400 m] or [0; 2 s] (or in other words, over the signal part processed for detection of the said high frequencies). If the frequency content of the signal comprises mainly "low" frequencies (rigid natural modes of the aircraft, comfort strategy), the applicable control rule is chosen, for example, according to the amplitude maximum (or if necessary several amplitude maxima) recorded over the entirety of the wind profile signal.

Each control rule defines, in the usual manner, on the one hand at least one mobile control surface to be actuated and on the other hand corresponding actuation parameters, such as the deflection angle (or the amplitude of deformation, as the case may be), the rate of deflection and the instant of the start of deflection of the said mobile control surface. Advantageously, these actuation parameters are calculated by taking into account, in particular, the phase difference that may exist between actuation of the mobile control surface and the corresponding response of the aircraft, so that the effects of the wind and the response of the aircraft to actuation of the mobile control surface are in phase. Thus the parameters of actuation of the mobile control surface are advantageously calculated in real time (at instant t), on the basis of the current wind profile signal (signal established or still valid at that instant t), according to the current amplitude of the said signal corresponding to a predefined distance $x_r$, or predefined instant $t_r$, depending on the mobile control surface, this distance $x_r$ or instant $t_r$ corresponding to the phase difference that may exist between actuation of the said mobile control surface and the response of the aircraft.

The present invention also relates to a device capable of employing the method according to the invention. In particular, the invention relates to a device for attenuating the effects of turbulence on an aircraft, characterized in that it comprises:
  frequency-determining means, adapted to process a wind profile signal such as defined in the foregoing so as to determine its frequency content,
  means for selecting a control strategy to be adopted according to the previously determined frequency content, which strategy makes it possible to identify one or more applicable control rules.

Advantageously, the device according to the invention additionally comprises means for determining a control rule to be applied to operate the mobile control surfaces of the aircraft according to the previously selected control strategy and possibly one or more amplitude maxima presented by the wind profile signal. The determination means are also capable of determining the control rule to be applied in its entirety (or in other words of calculating the corresponding actuation parameters) by taking into account, in particular, the phase difference that may exist between the actuation of each mobile control surface affected by the said control rule and the corresponding response of the aircraft.

The present invention is extended to an aircraft comprising a device according to the invention for attenuating the effects of turbulence.

BRIEF DESCRIPTION OF THE DRAWINGS

Other details and advantages of the present invention will become more apparent upon reading the description hereinafter, refers to the attached schematic drawings and is based on a preferred embodiment, provided by way of non-limitative illustration. In these drawings:

FIG. 1 is a schematic perspective view of an aircraft and of the environment ahead of it, wherein there are indicated measurement points targeted by a lidar making it possible to construct a wind profile signal used according to the invention, FIG. 2 is a diagram representing such a wind profile signal.

DETAILED DESCRIPTION OF THE INVENTION

Figure 3:
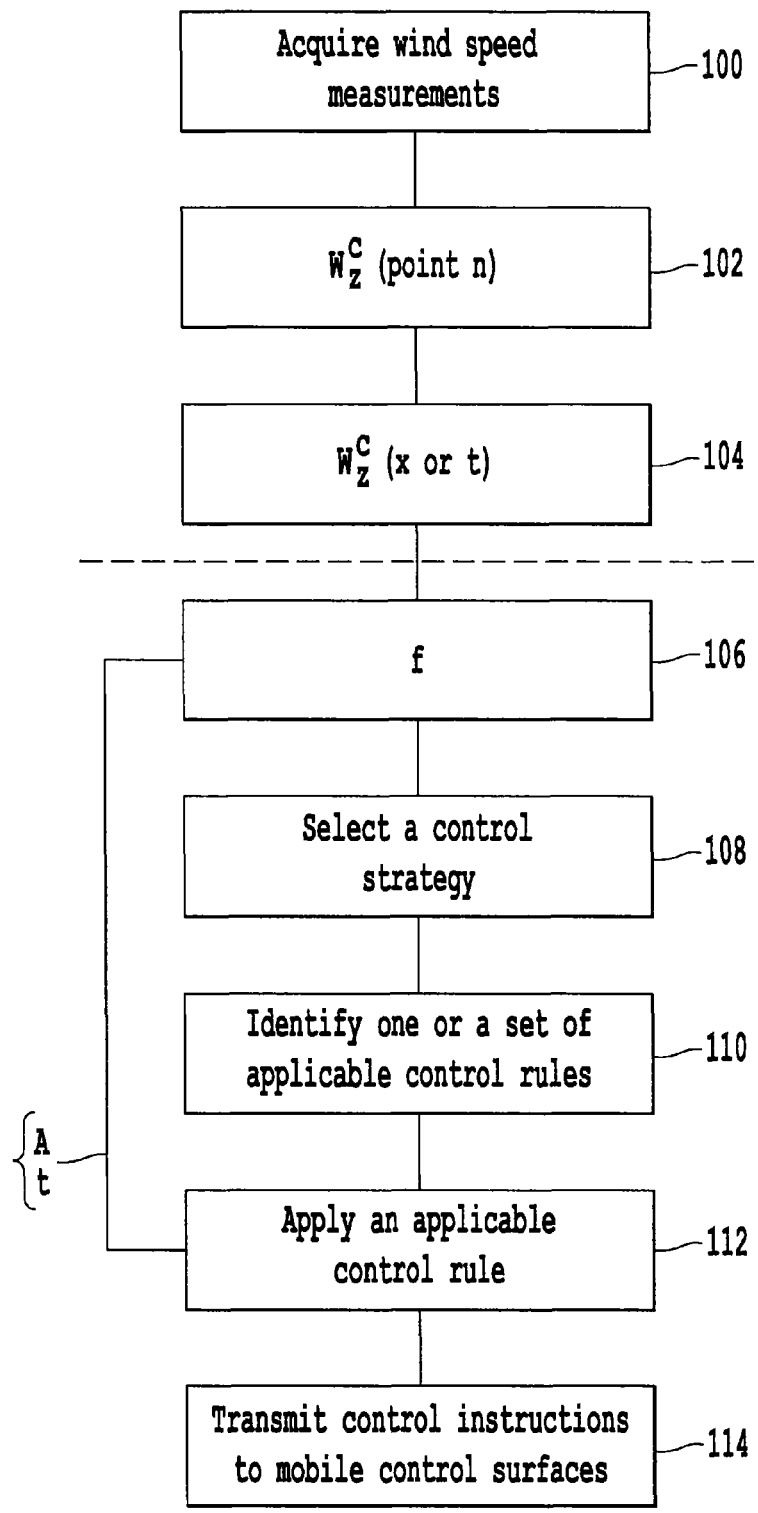
FIG. 3 is an organizational diagram representing an attenuation method according to the invention.

The aircraft illustrated in FIG. 1 is equipped with a device according to the invention for attenuating the effects of turbulence.

This attenuation device is connected to a lidar adapted to measure wind speeds at a plurality of pairs of measurement points situated at different distances, referred to as measurement distances, from the nose of the aircraft. As an alternative, the attenuation device according to the invention incorporates such a lidar. Advantageously, a single and unique lidar is used for these measurements, in order to limit the weight and the on-board volume in the aircraft. In the usual manner, this lidar comprises a laser capable of emitting directed incident light pulses individually or grouped in packets, and a telescope that collects the wave backscattered by the particles encountered by the incident light pulses.

The attenuation device according to the invention also comprises information technology processing means (software and hardware) with a microprocessor or microprocessors, which means are capable of acting as frequency-determining means, means for selecting a control strategy to be adopted and means for determining a control rule to be applied, such as defined below. These processing means are connected to a processing unit of the lidar. Alternatively, they incorporate all or part of the information technology means useful for performing the previously defined measurements of wind speed. Furthermore, these processing means may be installed at a single location of the aircraft (for example, a box incorporating the lidar) or may be split among several locations (and/or several units with a microprocessor or microprocessors).

The lidar is advantageously adapted to collect, for each incident light pulse or for each grouped pulse packet emitted by the laser, the wave backscattered at different times $t_n$, counting from emission of the incident light pulse, each time $t_n$ corresponding to a measurement distance $x_n$ according to the relation $t_n=2x_n/c$ (where c denotes the speed of light). Preferably, the distance $\Delta x$ between two consecutive measurement distances increases with x, for example exponentially. The laser of the lidar preferably has a wavelength situated in the ultraviolet, thus offering high resolution. Furthermore, it has a power adapted to make it possible to measure wind speeds at a maximum measurement distance between 500 m and 1500 m, for example on the order of 1000 m or 5 s. Nevertheless, it may have a lower power, in which case it delivers incident light pulses grouped in packets, in order to compensate for power that a priori is insufficient (for large measurement distances).

The lidar additionally comprises means for adjusting its sight direction, making it possible to modify the sight direction between two emitted incident light pulses (or between two packets). In the illustrated example, the lidar is programmed so as to emit incident light pulses in twelve sight directions. In other words, for certain measurement distances $x_n$ at least, the lidar is capable of measuring wind speeds at twelve measurement points 1 to 12.

The measurement points situated at the same measurement distance all belong to the same sphere centered on the lidar in the aircraft frame of reference. As an approximation, they are represented in FIG. 1 as belonging to the same plane, referred to as measurement plane, orthogonal to the longitudinal direction L of the aircraft and situated at a distance from the nose of the aircraft equal to the measurement distance. For clarity, only three measurement planes, situated at measurement distances $x_{p-2}$, $x_{p-1}$ and $x_p$, have been represented in FIG. 1; in addition, they have been intentionally spaced apart from one another for better legibility.

In the illustrated measurement plane situated at the measurement distance $x_p$:
  measurement points 1 and 11 form a vertical pair of measurement points that yields, by vector difference of the speeds measured at these points, an evaluation of the vertical component $W_z^A$ of the wind speed at a location of the atmosphere situated opposite—in longitudinal direction—a central or distal (meaning close to the tip) portion of the starboard wing of the aircraft,
  measurement points 2 and 10 form a vertical pair of measurement points that yields, by vector difference, an evaluation of the vertical component $W_z^B$ of the wind speed at a location of the atmosphere situated opposite—in longitudinal direction—a proximal (meaning close to the root) or central portion of the starboard wing of the aircraft, measurement points 3 and 9 form a vertical pair of measurement points that yields, by vector difference, an evaluation of the vertical component $W_z^C$ of the wind speed at a location of the atmosphere situated on a central longitudinal axis of the aircraft, or in other words opposite—in longitudinal direction—the nose and the fuselage of the aircraft, measurement points 4 and 8 form a vertical pair of measurement points that yields, by vector difference, an evaluation of the vertical component $W_z^D$ of the wind speed at a location of the atmosphere situated opposite—in longitudinal direction—a proximal (meaning close to the root) or central portion of the port wing of the aircraft, measurement points 5 and 7 form a vertical pair of measurement points that yields, by vector difference, an evaluation of the vertical component $W_z^E$ of the wind speed at a location of the atmosphere situated opposite—in longitudinal direction—a central or distal (meaning close to the tip) portion of the port wing of the aircraft, measurement points 1 and 5, or measurement points 2 and 4, form a transversal pair of measurement points that yields, by vector difference, an evaluation of the transversal component $W_t^A$ of the wind speed at a location of the atmosphere situated in a median vertical longitudinal plane (symmetry plane) of the aircraft, above the central longitudinal axis of the aircraft, measurement points 6 and 12 form a transversal pair of measurement points that yields, by vector difference, an evaluation of the transversal component $W_t^B$ of the wind speed at a location of the atmosphere situated on the central longitudinal axis of the aircraft, or in other words opposite the nose and the fuselage of the aircraft, measurement points 11 and 7, or measurement points 10 and 8, form a transversal pair of measurement points that yields, by vector difference, an evaluation of the transversal component $W_t^C$ of the wind speed at a location of the atmosphere situated in the median vertical longitudinal plane of the aircraft, below the central longitudinal axis of the aircraft.

Measurement points 1 of the different measurement planes are aligned in a first sight direction of the lidar; they form a first series of measurement points. Similarly, measurement points 2 of the different measurement planes are aligned in a second sight direction of the lidar and form a second series of measurement points, and so on. Preferably, each series of measurement points comprises at least four measurement points distributed over the distance range [0; 200 m] or [0; 1 s] and at least three other measurement points distributed over the distance range [200 m; 1000 m] or [1 s; 5 s]. The number of measurement points per series and their distribution may vary from one series to another. For example, the series of measurement points 3 and 9, which yield evaluations of the vertical component $W_z^C$ of the wind speed opposite the fuselage of the aircraft, advantageously comprise a relatively high number of measurement points, of which at least eight (and preferably at least 16) measurement points are distributed over the distance range [0; 200 m] or [0; 1 s] and at least six (and preferably at least 12) other measurement points are distributed over the distance range [200 m; 1000 m] or [1 s; 5 s]. On the other hand, the series of measurement points 2, 10, 4 and 8, for example, may comprise a smaller number of measurement points, especially in the distance range [200 m; 1000 m] or [1 s; 5 s].

The lidar preferably operates as follows. A first step 100 consists in acquiring wind speed measurements. A first light pulse is emitted in the first sight direction passing through measurement points 1; this pulse makes it possible to acquire the frequency of the wave backscattered at measurement point 1 for each measurement distance (of the series) and therefore to measure the wind speed in the first sight direction at each measurement point 1. The adjustment means are then actuated to modify the sight direction of the lidar, so that it points toward measurement points 2. A second light pulse is then emitted in the second sight direction (passing through measurement points 2); this pulse makes it possible to acquire the frequency of the backscattered wave for the series of measurement points 2 and therefore to measure the wind speed in the second sight direction for each of the said measurement points 2. The adjustment means are then actuated to modify the sight direction of the lidar, so that it points toward measurement points 3, then a third light pulse is emitted in this new—third—sight direction, and so on for all sight directions.

The acquisition of measurements for the twelve series of measurement points constitutes a measurement cycle, which is repeated indefinitely in iterative manner. By way of example, the lidar is advantageously adapted to perform a complete measurement cycle in less than 60 ms.

During and for each measurement cycle, the processing unit of the lidar calculates, or if necessary the processing means of the attenuation device calculate, by vector difference, in step 102, the vertical component $W_z^A$ of the wind speed in each measurement plane on the basis of speeds measured for measurement points 1 and 11 of the said measurement plane. In analogous manner, the vertical component $W_z^B$ of the wind speed in each measurement plane is calculated on the basis of speeds measured for measurement points 2 and 10 of the said measurement plane, and so on for all of the vertical components $W_z^C$ to $W_z^E$. The processing unit of the lidar calculates, or if necessary the processing means of the attenuation device also calculate, by vector difference, the transversal component $W_t^A$ of the wind speed in each measurement plane on the basis of speeds measured for measurement points 1 and 5 (or 2 and 4) of the said measurement plane, the same as the transversal component $W_t^B$—respectively $W_t^C$—of the wind speed in each measurement plane on the basis of speeds measured for measurement points 12 and 6—respectively 11 and 7 (or 10 and 8)—of the said measurement plane.

Alternatively or in combination, the processing unit of the lidar or the processing means of the attenuation device may if necessary calculate wind speed components on the basis of speeds measured for different measurement cycles (successive or otherwise) and/or for measurement points situated at different measurement distances (consecutive or otherwise), specifically in order to take into account the distance traveled by the aircraft within the terrestrial frame of reference in the course of one measurement cycle. For example, the processing unit of the lidar or the processing means of the attenuation device may be programmed to calculate the vertical component $W_z^A$ of the wind speed at a distance $x_i$ for cycle j on the basis, on the one hand, of the speed measured for measurement point 11 at the distance $x_i$ for cycle j−1, and, on the other hand, of the speed measured for measurement point 1 at the distance $x_i$ for cycle j (subject to the reservation that the direction of "rotation" of the measurement cycle is that described above). According to another example, especially in the case in which the speed of the aircraft is high and, for example, is greater than a predefined threshold, the processing unit of the lidar or the processing means of the attenuation device may be programmed to calculate the vertical component $W_z^C$ of the wind speed at a distance x, for cycle j on the basis, on the one hand, of the speed measured for measurement point 3 at the distance $x_{i+1}$ for cycle j−1, and, on the other hand, of the speed measured for measurement point 9 at the distance $x_i$ for cycle j.

Some or all of the vertical components $W_z^A$ to $W_z^E$ and transversal components $W_t^A$ to $W_t^C$ calculated in this way are used, by the lidar processing unit or by the processing means of the attenuation device, to construct one or more wind profile signals. Each wind profile signal represents, at a given instant, the component in an excitation direction (vertical or transversal) of the wind speed ahead of the aircraft according to the distance x.

For example, the set of components $W_z^C$ calculated for the different measurement distances and for a given measurement cycle is used in step 104 to construct a wind profile signal in the vertical direction in the median plane of the aircraft. FIG. 2 illustrates this signal which, in the example, is a continuous signal (which may nevertheless be in stages) obtained by interpolation on the basis of the calculated components $W_z^C$. This signal makes it possible to predict the excitations in pitch of the aircraft.

By analogy, the set of components $W_z^B$ calculated for the different measurement distances and for a given measurement cycle may be used to construct a wind profile signal in the vertical direction in a starboard plane of the aircraft. The set of components $W_z^D$ calculated for the different measurement distances and for a given measurement cycle may be used to construct a wind profile signal in the vertical direction in a port plane of the aircraft. These two signals are useful for the determination of roll moments to which the aircraft will be subjected.

Finally, the set of components $W_t^B$ calculated for the different measurement distances and for a given measurement cycle can be used to construct a wind profile signal in the transversal direction in a horizontal plane of the aircraft, transecting its fuselage. This signal makes it possible to evaluate the risks of sideslip of the aircraft.

The other calculated speed components may be used analogously to establish other wind profile signals if necessary or to refine the preceding signals in certain situations.

Steps 100 to 104 described in the foregoing provide an example of construction of one or more wind profile signals such as used by the invention. Other methods of construction are possible.

According to the invention, the processing means of the attenuation device are adapted for processing at least one wind profile signal, for example the wind profile signal $W_z^C$, so as to determine its frequency content. In other words, the attenuation device according to the invention comprises frequency-determining means capable of processing the wind profile signal $W_z^C$ so as to determine its frequency content.

It should be noted that the processing steps applied to determine this frequency content depend on the frequencies sought and therefore on the excitation direction in question, or in other words the wind signal profile being analyzed. The description hereinafter concerns the signal $W_z^C$ (vertical excitation direction, wind in the median plane of the aircraft).

This wind profile signal $W_z^C$ makes it possible in particular to detect if aircraft pitch phenomena (which generate great discomfort for persons) are likely to occur. For this purpose, the processing means of the attenuation device are adapted to detect whether the wind profile signal $W_z^C$ contains at least one frequency close to the incidence oscillation frequency of the aircraft. Such an incidence oscillation frequency is generally on the order of 0.3 Hz. To be able to observe such a frequency, it is useful to have available a signal covering a period of at least 3.4 s, for example on the order of 4 s. It is for this reason that, on the one hand, it is preferable to use a lidar whose maximum sight distance is some 5 s or 1000 m and, on the other hand, to define at least four—and preferably at least eight—measurement points over the distance range [0; 5 s] or [0; 1000 m] or, for reasons explained hereinafter, over the distance range [1 s; 5 s] or [200 m; 1000 m]. The pitch phenomena are advantageously countered by means of one or more mobile control surfaces of the aircraft tail. Such mobile surfaces have an indirect effect on the loads to which the fuselage and wings of the aircraft are subjected. It is therefore preferable to detect the corresponding turbulences as soon as possible, or in other words at a great distance from the nose of the aircraft. Consequently, it is preferable to analyze the part of the wind profile signal corresponding to the distance range [1 s; 5 s] or [200 m; 1000 m]. Alternatively, the entirety of the signal is analyzed.

In practice, the processing means process, in step 106, the entirety of the signal $W_z^C$ or the aforesaid signal part so as to determine if that signal or that part contains frequencies below 0.5 Hz. To do so, they comprise, for example, a low-pass filter, whose cutoff frequency is substantially equal to 0.5 Hz.

The processing means are also intended to make it possible to detect the presence of turbulences that could jeopardize the structure of the aircraft, and in particular its wings. For this purpose, they are advantageously adapted to detect whether the wind profile signal $W_z^C$ contains at least one frequency close to a (flexible) natural mode of bending oscillation of the aircraft wings. The first natural bending mode (around the longitudinal direction) of an aircraft wing is generally situated between 1.1 Hz and 1.5 Hz. To observe such a frequency, it is sufficient to analyze the wind profile signal over a period of 0.67 s to 1 s. Furthermore, the effects of such turbulence are advantageously countered by means of one or more mobile control surfaces of the wings. Such mobile surfaces have relatively high deflection speeds and, above all, exert a direct and immediate effect on the loads to which the wings are subjected. It therefore may be provided to analyze the wind profile signal in the proximity of the aircraft nose, a zone where the signal obtained is more precise.

In practice, the processing means process, in step 106, preferably the part of the wind signal profile $W_z^C$ corresponding to the distance range [0; 1 s] or [0; 200 m], so as to determine if this contains frequencies above 1 Hz. To do so, they comprise, for example, a high-pass filter, whose cutoff frequency is substantially equal to 1 Hz.

It should be noted that the wings of certain aircraft have a natural bending mode between 0.6 and 0.7 Hz. For these aircraft, the processing means are advantageously adapted to process the part of the wind profile signal corresponding to the distance range [0; 2 s] or [0; 400 m], so as to determine if this contains frequencies above 0.5 Hz. For this purpose, they comprise, for example, a high-pass filter, whose cutoff frequency is substantially equal to 0.5 Hz.

All of these processing steps make it possible to establish the frequency content of the wind profile signal $W_z^C$, which, in step 108, may now be used by the processing means to select a control strategy to be adopted. A frequency content composed mainly of frequencies lower than or equal to 0.5 Hz entails the selection of a comfort strategy, intended to reduce the aircraft pitch and thus improve the comfort of persons. A frequency content composed mainly of frequencies higher than 0.5 Hz or than 1 Hz entails the selection of a structural preservation strategy, intended to preserve the structure (especially the wing group) of the aircraft. A frequency content composed of frequencies lower than 0.5 Hz and of frequencies higher than 0.5 Hz or than 1 Hz (in substantially equivalent proportions) entails the selection of a mixed strategy, intended simultaneously to improve the comfort of persons and to preserve the wing group of the aircraft.

In step 110, the processing means identify one or a set of applicable control rules, according to the previously selected control strategy. As explained in the foregoing, the comfort strategy favors the use of mobile surfaces of the aircraft tail (elevators, rudders, elevons) or possibly of spoilers and/or flaperons of the wings. The structural preservation strategy favors the use of mobile control surfaces of the aircraft wings (ailerons, spoilers, flaps, slats); nevertheless, it does not exclude providing for the actuation of surfaces of the aircraft tail. The mixed strategy may require resorting to mobile control surfaces situated on the tail and on the wings of the aircraft.

The control rule to be applied is then determined entirely by the processing means (which therefore act as means for determining a control rule to be applied), in step 112. The control rule to be applied is the unique applicable control rule identified in step 110 or is chosen from among the set of applicable control rules identified in this step 110. In the second case, the control rule to be applied may be chosen according to the frequency content of the wind profile signal and/or according to one or more maximum amplitudes of this signal. For this purpose, signal-processing step 106 also preferably includes processing that makes it possible to determine the maximum amplitude of the wind profile signal over each of the signal parts processed previously in this step. If the control rule corresponds to a comfort strategy, the maximum amplitude used is the maximum amplitude observed over the entirety of the wind profile signal or over the distance range [1 s; 5 s] or [200 m; 1000 m]. If the control rule corresponds to a structural preservation strategy, the maximum amplitude used is the maximum amplitude observed over the distance range [0 s; 1 s] or [0 m; 200 m] or over the distance range [0; 2 s] or [0; 400 m] (depending on the aircraft). If the control rule corresponds to a mixed strategy, the maximum amplitude observed over the distance range [0; 1 s] or [0; 200 m], or [0; 2 s] or [0; 400 m], and the maximum amplitude observed over the entirety of the wind profile signal or over the distance range [1 s; 5 s] or [200 m; 1000 m] are preferably both necessary for choosing the control rule.

Each of the control rules according to the invention is pre-established by taking into account the maximum speed of deflection of each mobile control surface, the time that may elapse between the deflection of each mobile control surface and the effects of this deflection (response of the aircraft following actuation of the mobile surface), and possibly the time that may elapse between the encounter with each type of turbulence and the effects of this turbulence (response of the aircraft following the encounter with a turbulence). Depending on the mobile control surface to be actuated and on the type (frequency, maximum amplitude, etc.) of the imminent turbulence, it may be advantageous to advance or delay the actuation of the mobile control surface relative to the instant of the encounter with the turbulence, so that the response of the aircraft is in phase with the effects of the encountered turbulence. Each control rule therefore defines the mobile surface or surfaces to be actuated, their rates of deflection and counter-deflection, the instants of start of deflection and start of counter-deflection, which may be out of phase compared with the instant of the encounter with a turbulence, this according to the current amplitude of the wind profile signal corresponding to a predefined distance $x_r$ or predefined instant $t_r$, depending on the mobile control surface.

In step 114, the processing means employ the control rule determined in the preceding step, by transmitting corresponding control instructions to the mobile control surfaces in question.

Of course, all steps of the method according to the invention are executed in real time. The wind profile signal characterizes the atmospheric environment of the aircraft at a given instant and is constantly updated at least every 60 ms (duration of a measurement cycle). The control strategies to be adopted and the control rules to be applied are updated at the same frequency.

The invention may be the object of numerous variants compared with the illustrated embodiment, provided these variants fall within the scope defined by the claims.

For example, the described low-pass and high-pass filters may be replaced by frequency-determining means adapted to count the number of passes of the signal through the value zero over the signal part to be processed and to deduce therefrom a mean period then a mean frequency of the signal over this part. Alternatively, the determining means may use relationships, pre-established empirically and statistically, between the maximum amplitude and the standard deviation of a wind profile signal on the one hand and between the standard deviation and the frequency on the other hand, to determine the frequency content of the wind profile signal.

In addition, the processing means may also be intended to detect the presence of turbulences capable of jeopardizing the fuselage of the aircraft. The first natural bending mode (around a transversal direction) of the fuselage of an aircraft is generally situated between 2.5 Hz and 3 Hz. The objective is achieved, for example, by means of a high-pass filter whose cutoff frequency is substantially equal to 2.5 Hz, applied to the part of the signal corresponding to the distance range [0; 1 s] or [0; 200 m], even [0.5 s; 1 s] or [100 m; 200 m], or alternatively [0; 0.5 s] or [0; 100 m].

The invention claimed is:

1. A method for attenuating effects of turbulence on an aircraft, comprising:
    using at least one signal, as a wind profile signal in an excitation direction, representing, at a given instant in an aircraft frame of reference, a component, in the excitation direction, of wind speed ahead of the aircraft according to a plurality of distance points in a longitudinal direction of the aircraft;
    executing frequency determination, in which the wind profile signal is processed so as to determine frequency content thereof, the frequency content at the plurality of distance points in the longitudinal direction of the aircraft being representative of the frequency at which the aircraft will be excited in the excitation direction when the aircraft arrives at a position located at the plurality of distance points in the longitudinal direction of the aircraft; and
    selecting a control strategy to be adopted according to the determined frequency content, which strategy enables identification of one or more applicable control rules.

2. A method according to claim 1, wherein a control rule to be applied to operate mobile control surfaces of the aircraft is chosen according to the selected control strategy and one or more amplitude maxima presented by the wind profile signal.

3. A method according to claim 2, wherein an entirety of the control rule to be applied is determined by taking into account a phase difference that may exist between actuation of each mobile control surface affected by the control rule and a corresponding response of the aircraft.

4. A method according to claim 1, wherein, in the executing a frequency-determination, the wind profile signal is processed so as to determine if the wind profile signal or part thereof contains at least one frequency included in at least one predefined frequency range.

5. A method according to claim 4, wherein the wind profile signal is processed so as to determine if the wind profile signal or part thereof contains at least one frequency close to a rigid natural mode of the aircraft.

6. A method according to claim 5, wherein the processed signal is a wind profile signal in the vertical direction and the signal is processed so as to determine if the wind profile signal or part thereof contains at least one frequency close to an incidence oscillation frequency of the aircraft.

7. A method according to claim 6, wherein the wind profile signal is processed so as to determine if the wind profile signal contains at least one frequency lower than 0.5 Hz.

8. A method according to claim 4, wherein the wind profile signal is processed so as to determine if the wind profile signal or part thereof contains at least one frequency close to a flexible natural mode of the aircraft.

9. A method according to claim 8, wherein the processed signal is a wind profile signal in the vertical direction, and the signal is processed so as to determine if a part thereof corresponding to a distance range [0; 400 m] or [0; 2 s] contains at least one frequency above 0.5 Hz, or if a part thereof corresponding to the distance range [0; 200 m] or [0; 1 s] contains at least one frequency higher than or equal to 1 Hz.

10. A method according to claim 4, wherein, in the selecting the control strategy:
   if the determined frequency content is composed mainly of frequencies close to a rigid natural mode of the aircraft, a control comfort strategy is selected, intended to improve comfort of persons in the aircraft,
   if the determined frequency content is composed mainly of frequencies close to a flexible natural mode of the aircraft, a control structural preservation strategy is selected, intended to preserve a structure of the aircraft, and
   if the determined frequency content is composed both of frequencies close to a rigid natural mode of the aircraft and of frequencies close to a flexible natural mode thereof, in substantially equivalent proportions, a control mixed strategy is selected, intended to simultaneously improve the comfort of persons and to preserve the structure of the aircraft.

11. A method according to claim 10, wherein:
   the selection of the comfort strategy leads to application of control rules that bring about activation of mobile control surfaces chosen from among: elevators, rudders, elevons, flaperons, spoilers, ailerons, and
   the selection of the structural preservation strategy leads to application of control rules that bring about activation of mobile control surfaces chosen from among: ailerons, spoilers, flaps, slats, elevators, rudders.

12. A method according to claim 1, wherein the wind profile signal represents the wind speed ahead of the aircraft at various distances.

13. A device for attenuating effects of turbulence on an aircraft, comprising:
   frequency-determining means, configured to process a wind profile signal in a excitation direction, so as to determine frequency content thereof, which signal represents, at a given instant in an aircraft frame of reference, a component, in the excitation direction, of wind speed ahead of the aircraft according to a plurality of distance points in a longitudinal direction of the aircraft, the frequency content at the plurality of distance points in the longitudinal direction of the aircraft being representative of the frequency at which the aircraft will be excited in the excitation direction when the aircraft arrives at a position located at the plurality of distance points in the longitudinal direction of the aircraft; and
   means for selecting a control strategy to be adopted according to the determined frequency content, which strategy makes it possible to identify one or more applicable control rules.

14. A device according to claim 13, further comprising means for determining a control rule to be applied to operate mobile control surfaces of the aircraft, configured to determine an entirety of the control rule by taking into account a phase difference that may exist between actuation of each mobile control surface in question and a corresponding response of the aircraft.

15. An aircraft, comprising a device for attenuating effects of turbulence on the aircraft, configured to employ a method according to claim 1.

* * * * *